US007260071B2

(12) United States Patent
Katsumata et al.

(10) Patent No.: US 7,260,071 B2
(45) Date of Patent: Aug. 21, 2007

(54) RADIO LAN COMMUNICATION SYSTEM

(75) Inventors: Toshikazu Katsumata, Tokyo (JP); Hideo Shimizu, Tokyo (JP); Hiroshi Nomura, Tokyo (JP)

(73) Assignee: The Tokyo Electric Power Company, Incorporated, Tokyo (JP)

( * ) Notice: Subject to any disclaimer, the term of this patent is extended or adjusted under 35 U.S.C. 154(b) by 0 days.

(21) Appl. No.: 10/560,766

(22) PCT Filed: Jun. 10, 2004

(86) PCT No.: PCT/JP2004/008478

§ 371 (c)(1),
(2), (4) Date: Dec. 14, 2005

(87) PCT Pub. No.: WO2004/114600

PCT Pub. Date: Dec. 29, 2004

(65) Prior Publication Data

US 2006/0126580 A1    Jun. 15, 2006

(30) Foreign Application Priority Data

Jun. 23, 2003    (JP) ............................. 2003-177524

(51) Int. Cl.
*H04Q 7/20* (2006.01)
*H04Q 7/00* (2006.01)
(52) U.S. Cl. ................... 370/328; 370/338; 455/452.1; 455/453
(58) Field of Classification Search ................ 370/328, 370/309, 338, 341, 310.2, 315, 329, 331; 455/422.1, 450, 435.1, 436, 444, 452.1, 453
See application file for complete search history.

(56) References Cited

U.S. PATENT DOCUMENTS

| 5,787,077 | A | * | 7/1998 | Kuehnel et al. ............ 370/331 |
| 7,039,027 | B2 | * | 5/2006 | Bridgelall .................... 370/329 |
| 7,082,114 | B1 | * | 7/2006 | Engwer et al. ............. 370/331 |
| 2003/0112820 | A1 | * | 6/2003 | Beach ......................... 370/465 |
| 2003/0191856 | A1 | * | 10/2003 | Lewis et al. ................. 709/241 |
| 2003/0207683 | A1 | * | 11/2003 | Lempio et al. .......... 455/422.1 |
| 2004/0066759 | A1 | * | 4/2004 | Molteni et al. ............. 370/329 |
| 2005/0147068 | A1 | * | 7/2005 | Rajkotia ..................... 370/338 |

FOREIGN PATENT DOCUMENTS

| JP | 2000-295650 | 10/2000 |
| JP | 2000-308116 | 11/2000 |
| JP | 2001-237856 | 8/2001 |
| JP | 2002-125069 | 4/2002 |
| JP | 2002-359864 | 12/2002 |

* cited by examiner

*Primary Examiner*—Sonny Trinh
(74) *Attorney, Agent, or Firm*—Leydig, Voit & Mayer, Ltd.

(57) ABSTRACT

A wireless LAN communication system includes a base stations having terminals respectively associated with the base stations and managed by a network management system. In the wireless LAN communication system, each of the base stations includes an association information transmitting function for transmitting association information for a terminal to the terminal through a beacon, and each of the terminals includes an association set destination base station selecting function for selecting an association set destination base station based on the association information transmitted from the base station. Based on the association information transmitted by the base station, the terminal autonomously selects a connection destination base station to perform load sharing.

7 Claims, 7 Drawing Sheets

RADIO LAN COMMUNICATION SYSTEM

TECHNICAL FIELD

The present invention relates to a wireless LAN communication system, and more particularly to load sharing (load balance) among base stations.

BACKGROUND ART

In a conventional wireless LAN communication system of this kind, when a base station has traffic larger than a specified value, the base station selects a terminal having traffic larger than a specified value from terminals connected to the base station and switches the channel of the selected terminal and a channel of another base station having traffic smaller than the specified value. In this case, the channel of the base station having traffic smaller than the specified value is determined according to a result of monitoring by a receiver for monitoring other channels, provided for each base station (see JP 2001-237856 A, for example).

In the above-described conventional load sharing among base stations in a wireless LAN communication system, to perform channel changeover, respective base stations need to monitor the other channels to determine a channel of another base station having traffic smaller than the specified value.

The present invention has been made to solve the problem described above, and has an object to provide a wireless LAN communication system capable of performing load sharing among base stations in which a terminal autonomously selects a connection destination base station based on information on the number of associations transmitted from each of the base stations.

DISCLOSURE OF THE INVENTION

In view of the above object, the present invention provides a wireless LAN communication system, including a plurality of base stations each having terminals which are set to be associated therewith and managed by an NMS, the wireless LAN communication system being characterized in that: each of the base stations includes an association information transmitting function for transmitting association information for a terminal to the terminal by a beacon; and each of the terminals includes an association set destination base station selecting function for selecting an association set destination base station based on the association information transmitted from the base station.

BEST MODE FOR CARRYING OUT THE INVENTION

Figure 1:
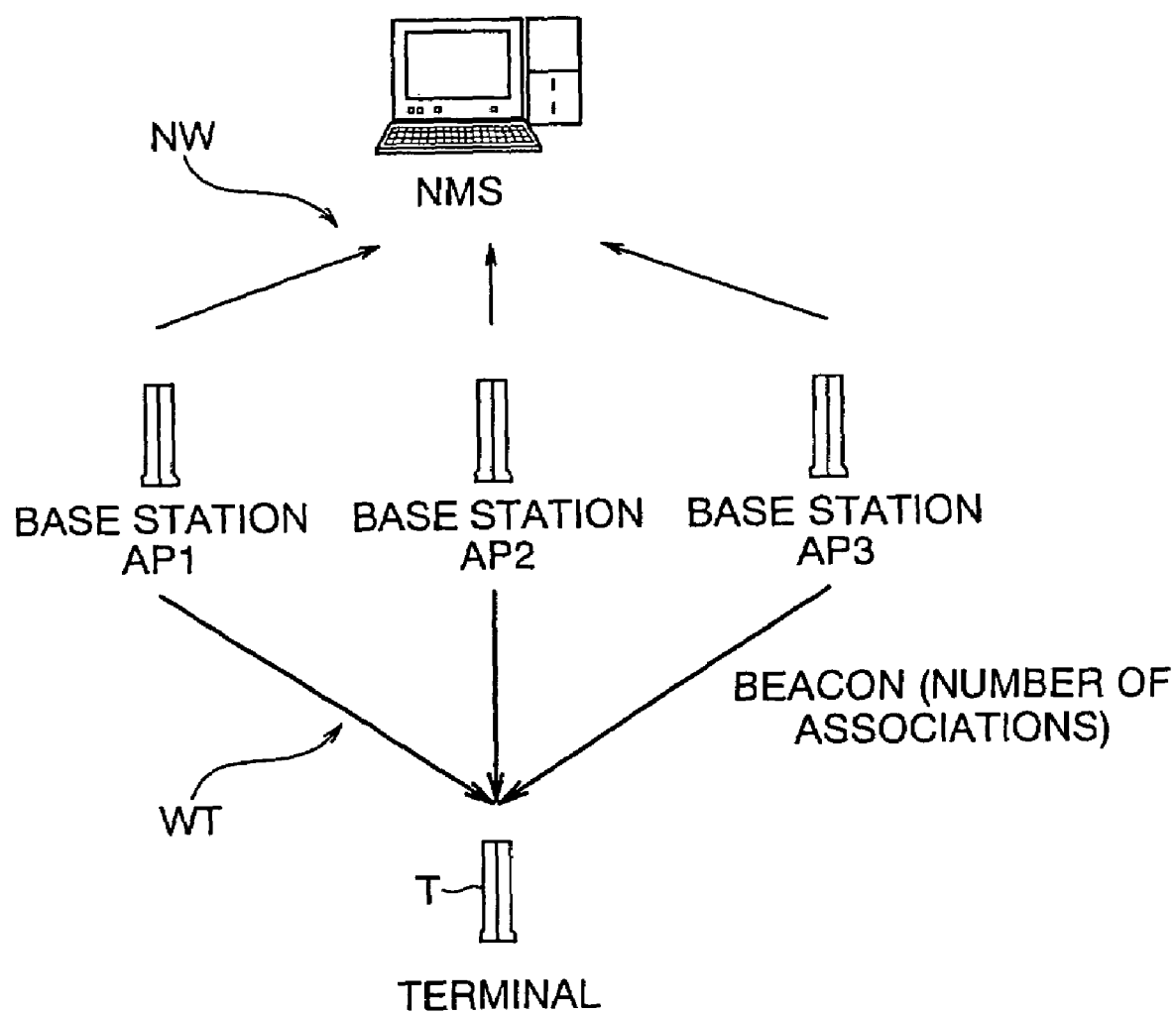
FIG. 1 is a diagram schematically showing a configuration of a wireless LAN communication system according to an embodiment of the present invention.

FIG. 1 schematically shows a configuration of a wireless LAN communication system according to the present invention. A plurality of wireless base stations AP1 to AP3 (for example, three stations herein) are connected to an NMS (network management system) via a wired network NW. Radio communications WT are performed between the wireless base stations AP1 to AP3 and a terminal T. In practice, a great number of terminals T are separately associated with each of the base stations AP1 to AP3.

In the present invention, the terminal T autonomously selects a connection destination base station based on information on the number of associations transmitted from each of the base stations AP1 to AP3 to balance loads of the base stations AP1 to AP3. At this time, in order to balance the loads of the base stations AP1 to AP3, connection terminals T are accommodated in a balanced manner. This prevents extreme load bias when a new base station is added in an identical service area due to an increase in traffic, and other cases. In addition, in order to ensure VoIP (audio data) quality, VoIP registration users are assigned to a plurality of base stations in a balanced manner.

The base stations AP1 to AP3 notify the terminal T of remaining association counts (association information) by beacon frames. The terminal T determines an association set destination base station based on the remaining association counts notified by the base stations AP1 to AP3 and/or radio reception conditions (RSSI (radio-wave level), PER (communication quality: packet error rate)) with respect to the base stations AP1 to AP3. In other words, the terminal T selects the best AP (access point) based on the load sharing in which loads are evenly balanced among the base stations.

Note that a remaining association count generally represents a value obtained by subtracting the number of associated terminals from the number of terminals to which IP addresses are assigned. When communications are preferentially performed for a group of particular terminals, the remaining association count may be obtained from the formula (the number of terminals to which IP addresses are assigned)—(the number of terminals belonging to a particular group associated), with the number of terminals other than terminals belonging to a particular group being excluded.

Automatic Base Station Selection

According to the present invention, each of the base stations AP1 to AP3 sets the remaining association count in a beacon frame and transmits the beacon frame. The base stations AP1 to AP3 accept an association set request from the terminal T unless the maximum number of associations is exceeded. When the number of associations exceeds its threshold value, the base stations AP1 to AP3 notify the NMS of the state by a trap via the network.

Figure 2:
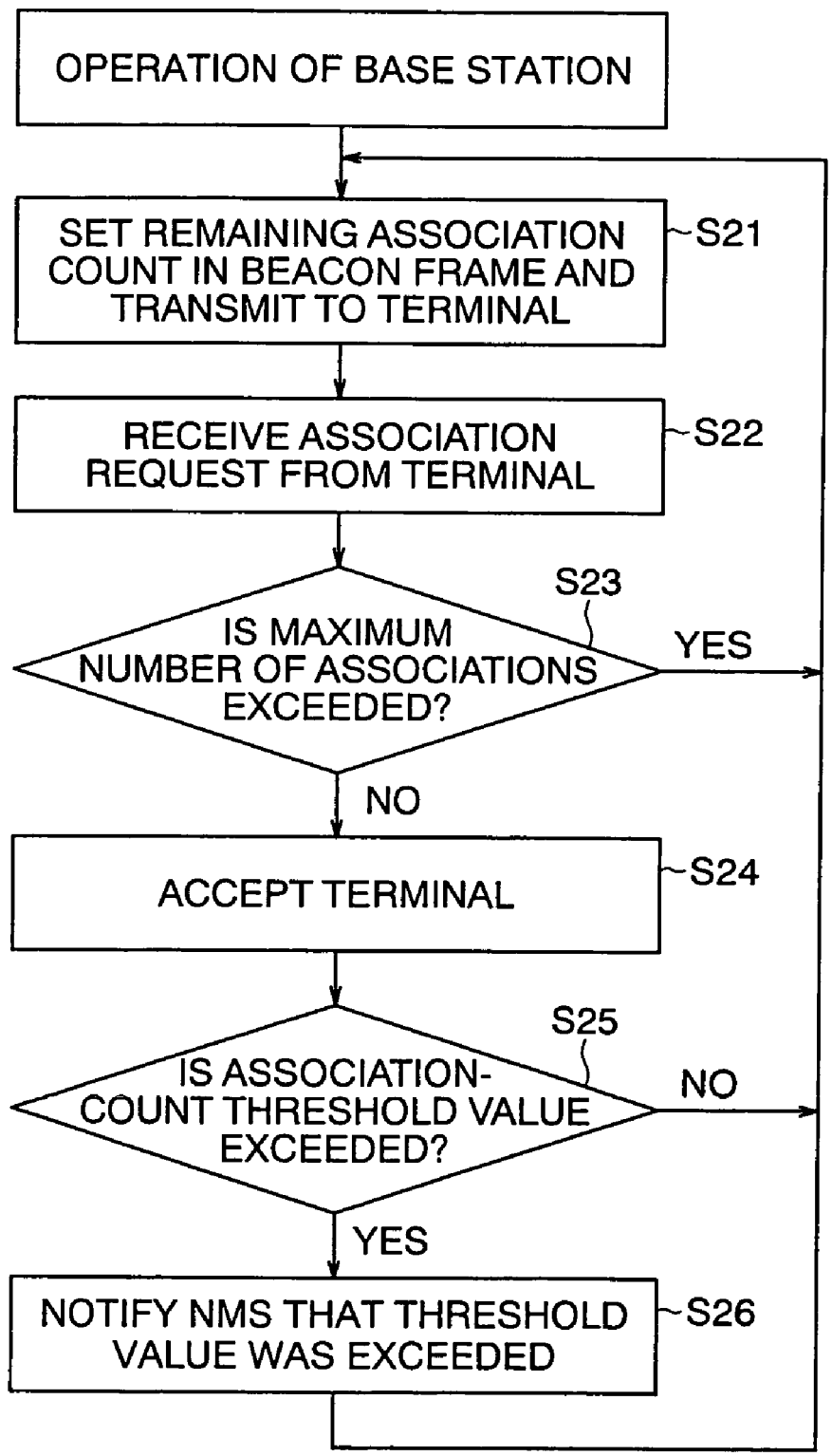
FIG. 2 is a flowchart showing an example of an operation performed by a base station in the wireless LAN communication system according to the present invention.

FIG. 2 shows an operational flowchart of each of the base stations AP1 to AP3 in FIG. 1. Each of the base stations AP1 to AP3 sets the remaining association count in a beacon frame and transmits the beacon frame to each terminal T (Step S21). When an association (set) request is transmitted from a terminal T (Step S22), each base station judges whether the maximum number of associations is exceeded (Step S23). When the maximum number of associations is not exceeded, the base station accepts the terminal T (Step S24). Then, the base station judges whether a predetermined association-count threshold value (a number smaller than the maximum number of associations) is exceeded (Step S25). When the predetermined association-count threshold value is exceeded, the base station notifies the NMS by transmitting a trap via the network NW that the association-count threshold value is exceeded (Step S26).

Figure 3:
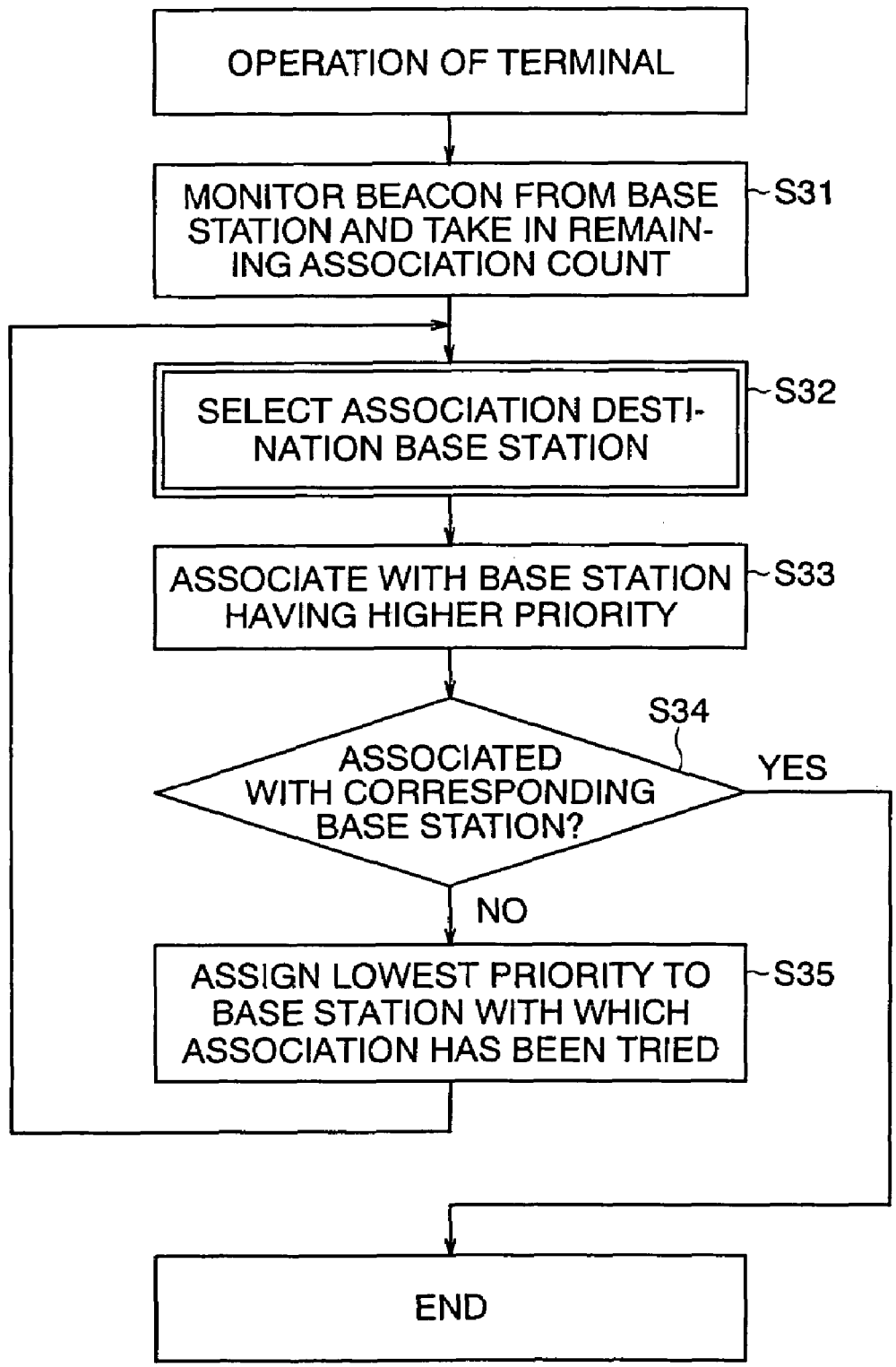
FIG. 3 is a flowchart showing an example of an operation performed by a terminal in the wireless LAN communication system according to the present invention.

FIG. 3 shows an operational flowchart of the terminal T in FIG. 1. The terminal T first takes in the remaining association counts of the base stations notified with beacon frames by the base stations AP1 to AP3 (Step S31), and then selects an association destination base station according to these remaining association counts and, as needed, also radio reception conditions (RSSI, PER) with respect to the base stations (Step S32). A function of detecting radio reception conditions (RSSI, PER) is normally provided in the terminal T.

Figure 4:
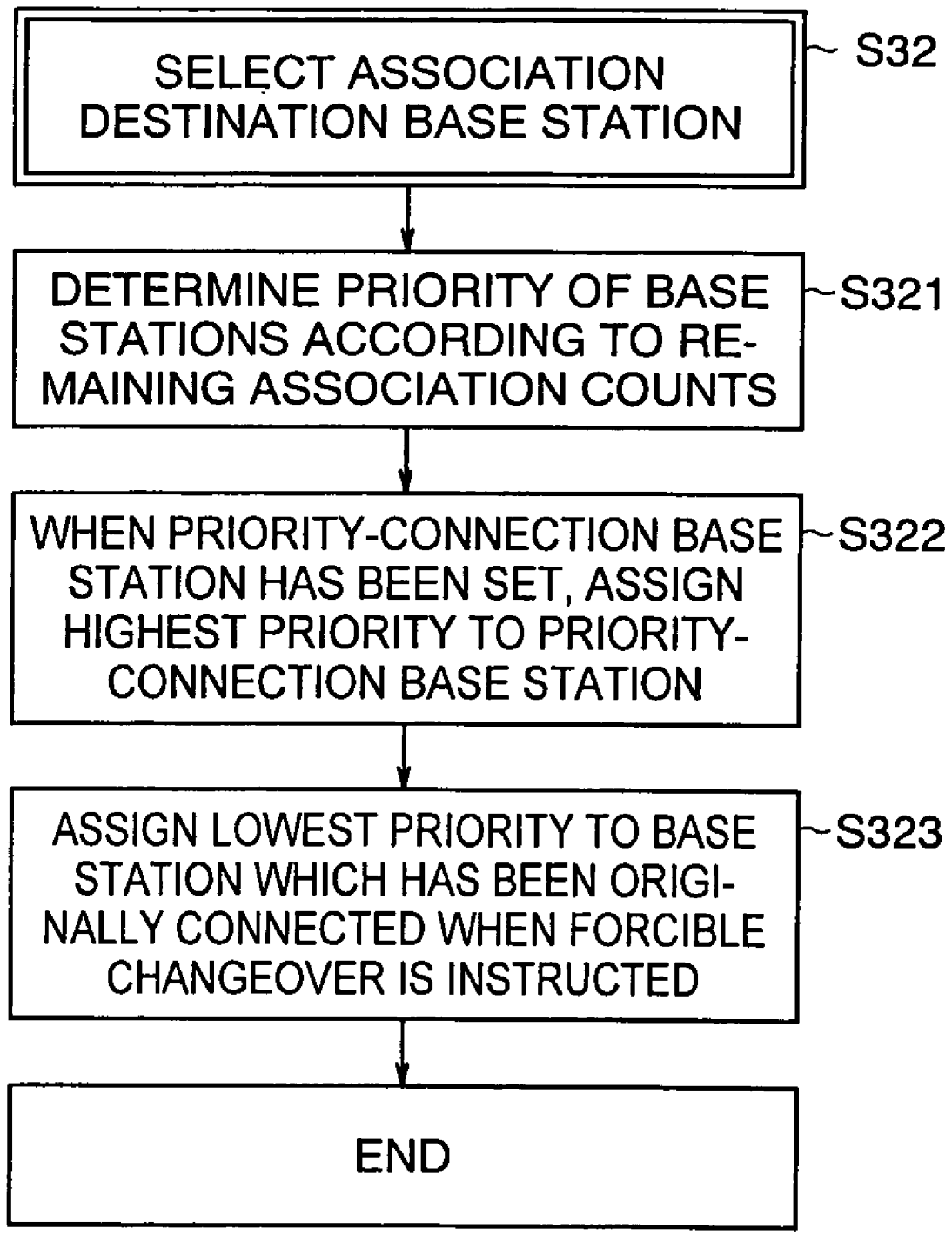
FIG. 4 is a flowchart showing an example of an operation to select an association destination base station in FIG. 3.

An association destination base station is selected so as to select the best AP based on load sharing. When an association destination base station is selected, the priority of the base stations AP1 to AP3 is determined according to the remaining association counts, as shown in FIG. 4 (Step S321). When a priority-connection base station has been set, the highest priority is given to that base station (Step S322). When forcible changeover to be described later is instructed, a base station which has been connected is given the lowest priority (Step S323).

Returning to FIG. 3, after an association destination base station is selected, the terminal T associates with a base station having higher priority (Step S33). If the terminal T cannot associate with that base station (Step S34), the terminal T assigns the lowest priority to the base station with which the terminal T has tried to associate (Step S35). The terminal T returns to Step S32 to select an association destination base station again.

Figure 5:
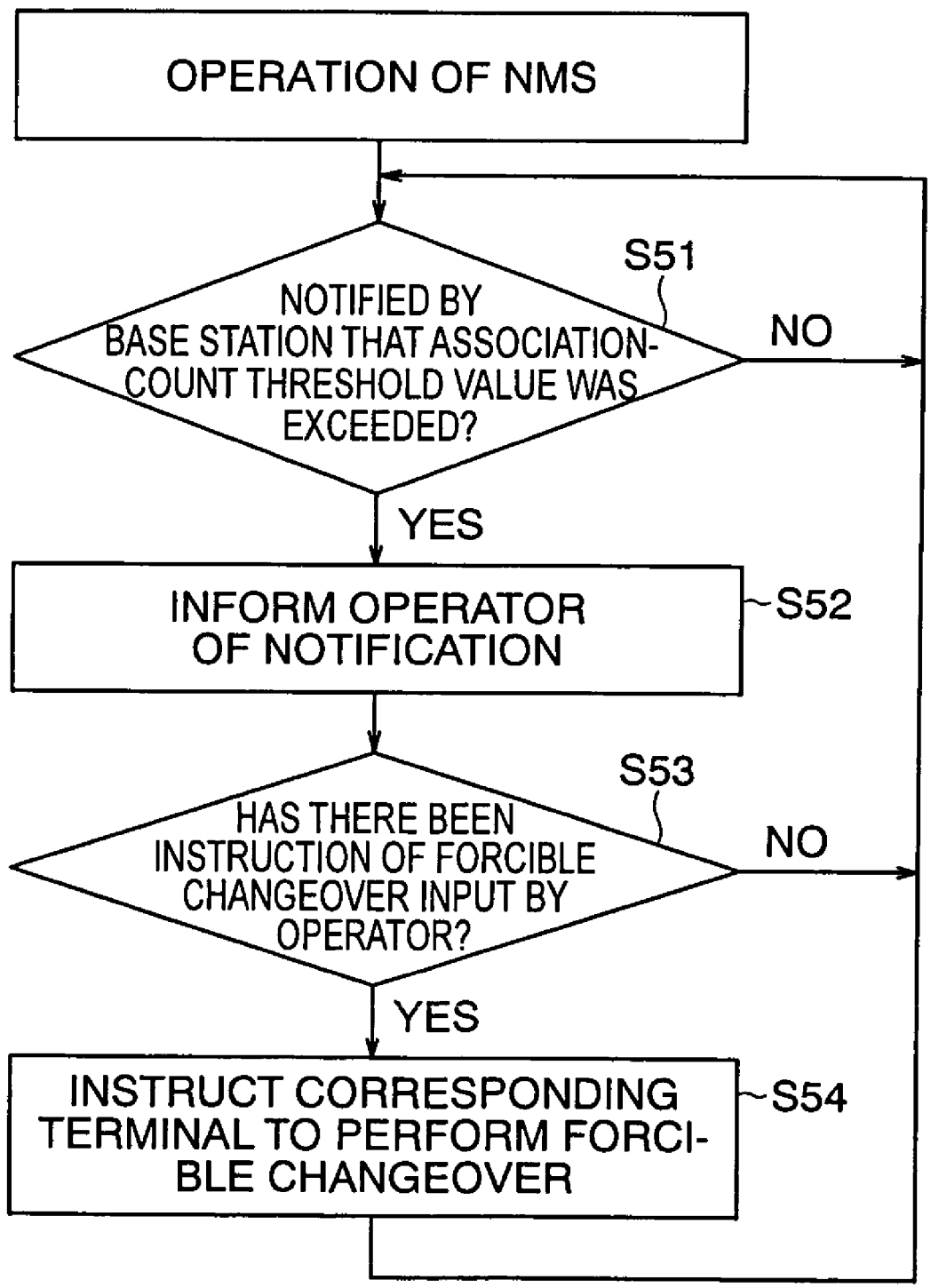
FIG. 5 is a flowchart showing an example of an operation performed by an NMS in the wireless LAN communication system according to the present invention.

FIG. 5 shows an operational flowchart of the NMS in FIG. 1. Although the NMS is not involved in the selection of a base station by the terminal T, the NMS regularly monitors the loads (the amount of traffic such as the number of transfer packets) of the base stations AP1 to AP3 as statistical information and monitors respective association-count threshold values by traps. Upon reception of a notification indicating that the association-count threshold value is exceeded (Step S51), the NMS informs an operator of the notification (by displaying on a monitor screen, for example) (Step S52). When the operator inputs to instruct forcible changeover (Step S53), the NMS instructs, via the base station, the corresponding terminal to perform forcible changeover (Step S54). The forcible changeover will be described later.

Note that since VoIP (audio data) is required to be immediately transmitted, it largely uses wireless resources and causes an increase in load at a base station. Accordingly, from a point of view that VoIP users are assigned in a balanced manner to a plurality of base stations in order to ensure VoIP (audio data) quality, the VoIP users are registered in advance in the system side as VoIP registration users, and respective base stations grasp the number of VoIP registration users as well as the number of associations. In such a system, a remaining VoIP registration user count may be combined with the remaining association count as association information. Alternatively, the remaining VoIP registration user count may be used in place of the remaining association count.

In this case, the base stations notify a terminal of the remaining association counts and the remaining VoIP registration user counts by beacon frames, and the terminal determines an association destination base station based on the radio reception conditions (RSSI, PER), and the remaining association counts and the remaining VoIP registration user counts, which have been notified by the base stations.

Here, a remaining VoIP registration user count represents the number of VoIP users who can be further registered at a base station that registers VoIP users, that is, a remaining VoIP registration user count with respect to the number of maximum VoIP registration users in a system where audio data is extracted from communication data; QoS parameters are provided to control the audio data and ordinary data separately from each other; the audio data, that is, VoIP, is controlled, for example, with the highest communication priority; and further, users using VoIP are registered as VoIP registration users to thereby evenly balance the loads of the base stations. Note that the present invention can be applied to a system where a user using VoIP is registered as a VoIP registration user, so the system does not necessarily have to control VoIP is with the highest priority.

Then, each of the base stations AP1 to AP3 sets the remaining association count and the remaining VoIP registration user count in a beacon frame and transmits the beacon frame. The base stations AP1 to AP3 accept an association set request from the terminal T unless the maximum number of associations is exceeded. When the number of associations and the number of VoIP registration users exceed their threshold values, the base stations AP1 to AP3 notify the NMS of the state by a trap.

The terminal T determines a base station to be connected from the base stations AP1 to AP3 based on the radio reception conditions (RSSI, PER) with respect to the base stations AP1 to AP3, and the remaining association counts and the remaining VoIP registration user counts at the base stations AP1 to AP3, which have been notified with beacon frames by the base stations AP1 to AP3. Then, the terminal T sets an association with the determined base station.

An algorithm procedure applied to the selection of an association destination base station from the base stations AP1 to AP3 can be changed according to a firmware upgrade or the like. For example: 1) a base station having a larger remaining VoIP registration user count is selected; 2) a base station having a larger remaining association count is selected when base stations have the same remaining VoIP registration user count; and 3) a base station is selected randomly when base stations have the same remaining association count. Other factors are basically the same as those described above.

Forcible Changeover of Base Station

A forcible changeover function for changing over a connection destination base station of the terminal T is provided in order to adjust loads among the plurality of base stations AP1 to AP3 according to an instruction of the operator when a new base station is added or when bias is detected in the number of associations, the number of VoIP registration users, or the amount of traffic during a stationary operation.

Figure 6:
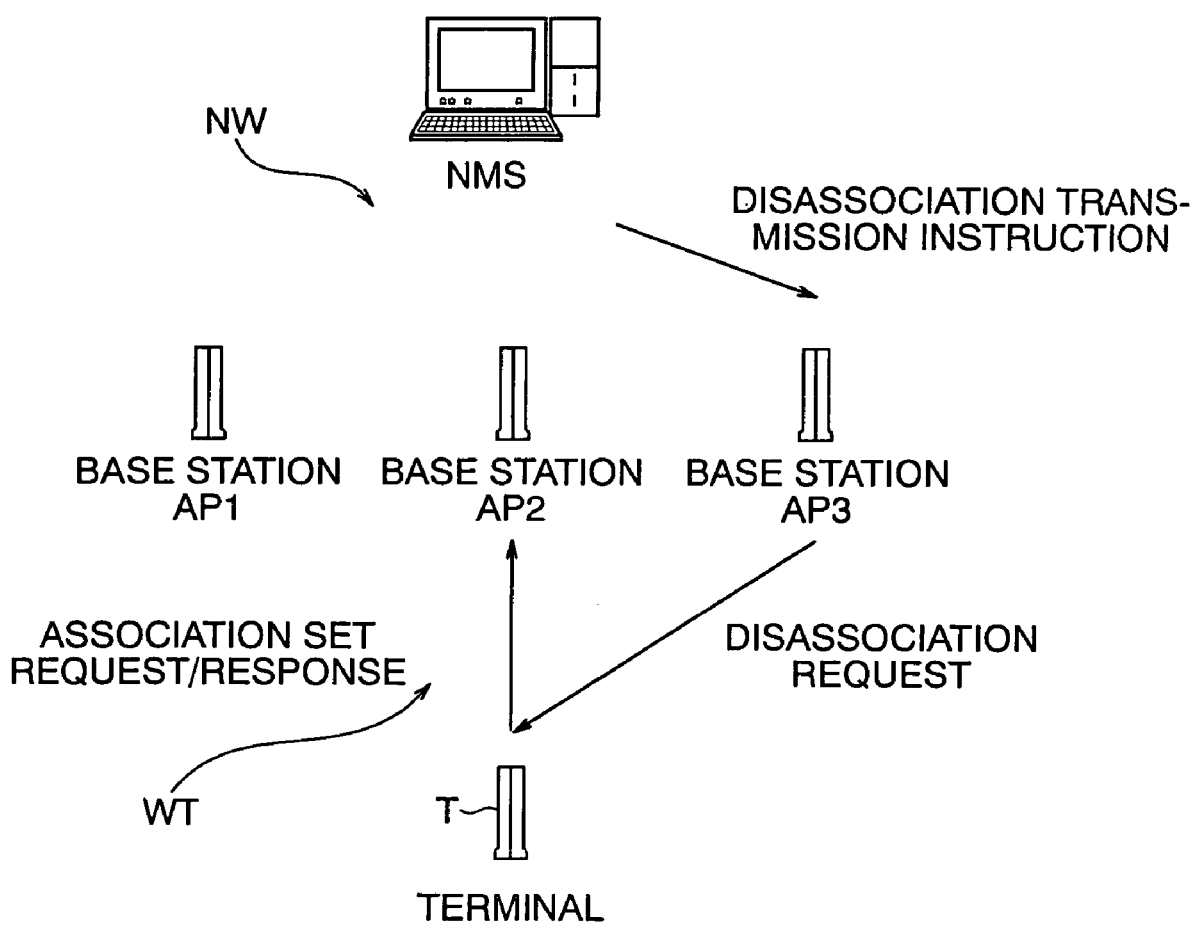
FIG. 6 is a diagram for explaining base station forcible changeover in the wireless LAN communication system according to the present invention.
Figure 7:
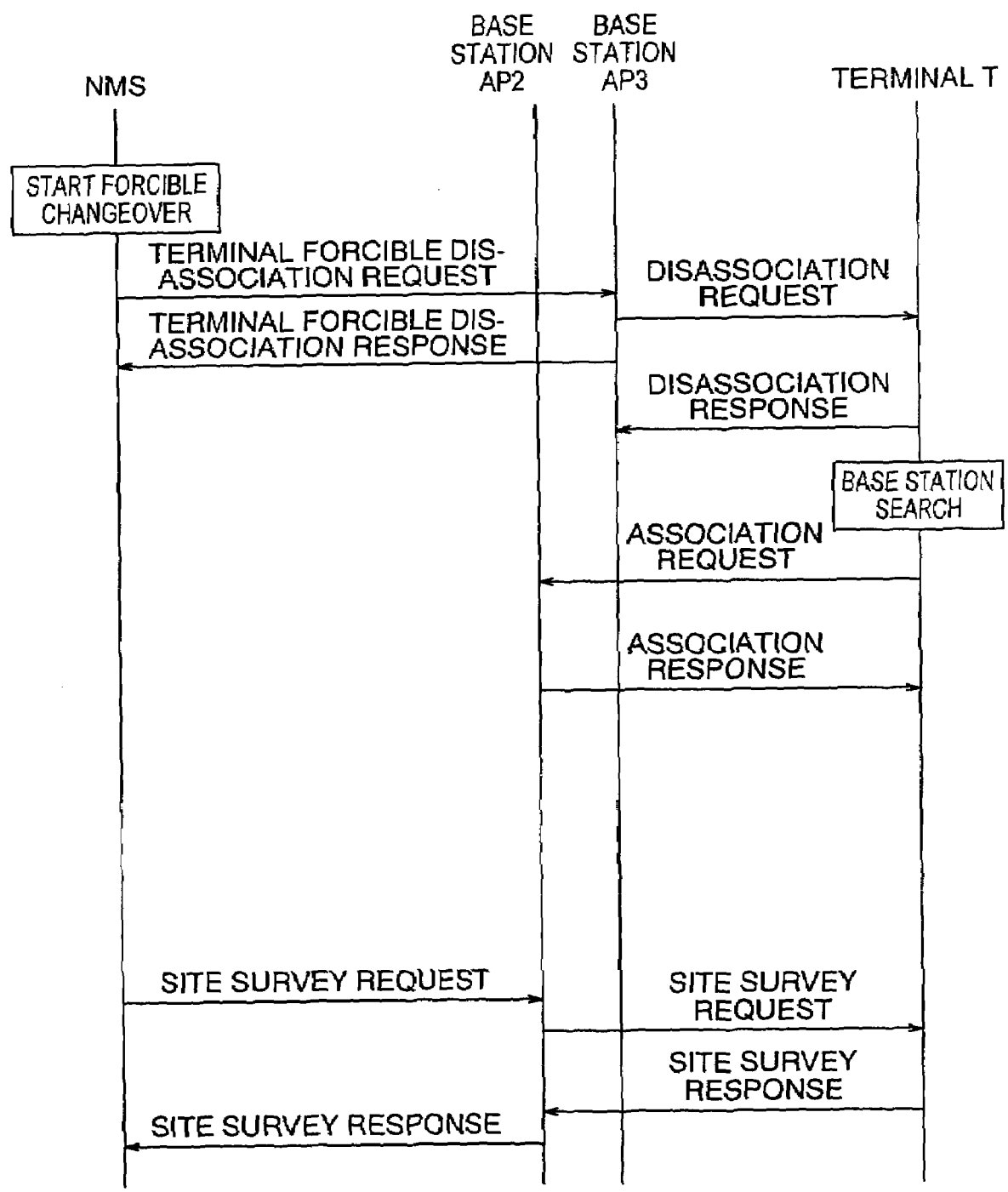
FIG. 7 is a flowchart showing an example of an operation of a base station forcible changeover in the wireless LAN communication system according to the present invention.

FIG. 6 is a diagram of the wireless LAN communication system according to the present invention, for explaining the base station forcible changeover. FIG. 7 is a sequence of the base station forcible changeover. A changeover sequence will be described with reference to FIGS. 6 and 7.

In the NMS, the operator monitors, on a screen display or the like, the numbers of transfer packets (traffic information) which are periodically collected from the base stations AP1 to AP3 to check whether the traffic among the base stations is balanced or not. At the same time, the operator obtains the numbers of associations and the numbers of VoIP registration users of the base stations from association logs. As a result, when it is determined that a connection destination base station of the terminal needs to be changed over, the following procedure from step (a) is executed based on the operator's judgment.

In addition, when the network configuration is changed, for example, by adding a new base station, and when a trap indicating that the threshold values are exceeded (for the number of associations and the number of VoIP registration users) is received from a base station, the following procedure from step (a) is executed based on the operator's judgment.

(a) Under the above-described situations, when the operator judges in the NMS that forcible changeover is necessary and inputs to a computer of the NMS an instruction for the forcible changeover, the forcible changeover is started to make a terminal forcible disassociation request (a disassociation request transmission instruction) to cause the base station AP3 which is an association set destination of the target terminal T to transmit a disassociation request to the target terminal T. The NMS knows the association terminals of each of the base stations from normal communications and information periodically collected from the base stations.

(b) The base station AP3 transmits a disassociation request to the target terminal T, and returns a terminal forcible disassociation response to the NMS.

(c) The terminal T returns a response to the disassociation request, then starts the procedure of the above-described best AP selection based on load sharing to search for a base station by transferring an association request and an association response, and determines a new association set destination (for example, the base station AP2). Note that the terminal T holds the radio reception conditions (RSSI, PER) of all base stations measured during execution of the above procedure.

(d) After completion of the changeover, the NMS makes an inquiry to the terminal T via the new association destination base station AP2 about the radio condition of the base station which was measured during the procedure of "connection destination AP changeover processing" by transferring a site survey request and a site survey response (when the operator judges that it is necessary).

According to the present invention as described above, there is provided a wireless LAN communication system, including a plurality of base stations each having terminals which are set to be associated therewith and managed by an NMS, the wireless LAN communication system being characterized in that: each of the base stations has an association information transmitting function for transmitting association information for a terminal to the terminal by a beacon; and each of the terminals has an association set destination base station selecting function for selecting an association set destination base station based on the association information transmitted from the base station. Therefore, load sharing is realized among base stations in which a terminal autonomously selects a connection destination base station based on association information transmitted from each of the base stations.

INDUSTRIAL APPLICABILITY

The present invention can be basically applied to all wireless LAN communication systems.

The invention claimed is:

1. A wireless LAN communication system, comprising a plurality of base stations, each base station having terminals which are associated with the respective base stations, the base stations being managed by an NMS (network management system), wherein
   each of the base stations comprises association information transmitting means for transmitting association information for a terminal to the terminal through a beacon,
   each of the terminals comprises association set destination base station selecting means for selecting an association set destination base station based on the association information transmitted from the base station,
   a VoIP user who transfers audio data is registered as a VoIP registration user in advance, and
   the association information includes a remaining VoIP registration user count at the base station.

2. The wireless LAN communication system according to claim 1, wherein each base station further comprises association count excess notifying means for notifying the NMS through a trap when an association count for a terminal exceeds a predetermined value.

3. The wireless LAN communication system according to claim 2, wherein the association information includes a remaining association count at the base station.

4. The wireless LAN communication system according to claim 2, wherein
   the association information includes the remaining VoIP registration user count and the remaining association count at the base station, and
   the association set destination base station is selected by the association set destination base station selecting means of the terminal based on the remaining VoIP registration user count and the remaining association count.

5. The wireless LAN communication system according to claim 1, wherein the association information includes a remaining association count at the base station.

6. The wireless LAN communication system according to claim 1, wherein
   the association information includes the remaining VoIP registration user count and the remaining association count at the base station, and
   the association set destination base station is selected by the association set destination base station selecting means of the terminal based on the remaining VoIP registration user count and the remaining association count.

7. The wireless LAN communication system according to claim 1, wherein the NMS comprises disassociation request transmission instructing means for causing a base station to transmit a disassociation request to a terminal according to an instruction input by an operator and, in response to the instruction, the base station and the terminal select an association set destination base station using the association information transmitting means and the association set destination base station selecting means, respectively.

* * * * *